(12) United States Patent
Chuang et al.

(10) Patent No.: US 8,335,997 B2
(45) Date of Patent: Dec. 18, 2012

(54) ELECTRONIC DEVICE AND METHOD FOR SORTING MENU OPTIONS OF A PROGRAM MENU IN THE ELECTRONIC DEVICE

(75) Inventors: Wei-Chih Chuang, Tu-Cheng (TW); Sheng-Chien Huang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 662 days.

(21) Appl. No.: 12/508,740

(22) Filed: Jul. 24, 2009

(65) Prior Publication Data
US 2010/0070923 A1    Mar. 18, 2010

(30) Foreign Application Priority Data
Sep. 18, 2008    (CN) .......................... 2008 1 0304552

(51) Int. Cl.
*G06F 3/048*    (2006.01)
(52) U.S. Cl. ......... 715/825; 715/810; 715/811; 715/866
(58) Field of Classification Search ................. 715/788, 715/789, 794, 764–768, 781, 806, 807, 810–845, 715/866
See application file for complete search history.

(56) References Cited

U.S. PATENT DOCUMENTS

| 2001/0019338 A1* | 9/2001 | Roth ............................ 345/811 |
| 2004/0179016 A1* | 9/2004 | Kiser ........................... 345/531 |
| 2009/0019394 A1* | 1/2009 | Sekimoto et al. ............. 715/811 |

OTHER PUBLICATIONS

Wei Li-Li et al., the Journal "Algorithms of Static Simply Linked Lists," Published on Jul. 1, 2008, in Journal of Science and Technology Information of China (translation of abstract from Chinese to English shown on first page of enclosed document).

* cited by examiner

*Primary Examiner* — Weilun Lo
*Assistant Examiner* — Enrique Iturralde
(74) *Attorney, Agent, or Firm* — Altis Law Group, Inc.

(57) ABSTRACT

A method for sorting menu options in a program menu of an electronic device creates an order parameter, a basic count parameter, and a carry count parameter to each menu option. The basic count parameters, the carry count parameters, and the order parameters are recalculated in response to a user-selected menu option, a user-added menu option, or a user-deleted menu option. The menu options are displayed according to the order parameters.

20 Claims, 11 Drawing Sheets

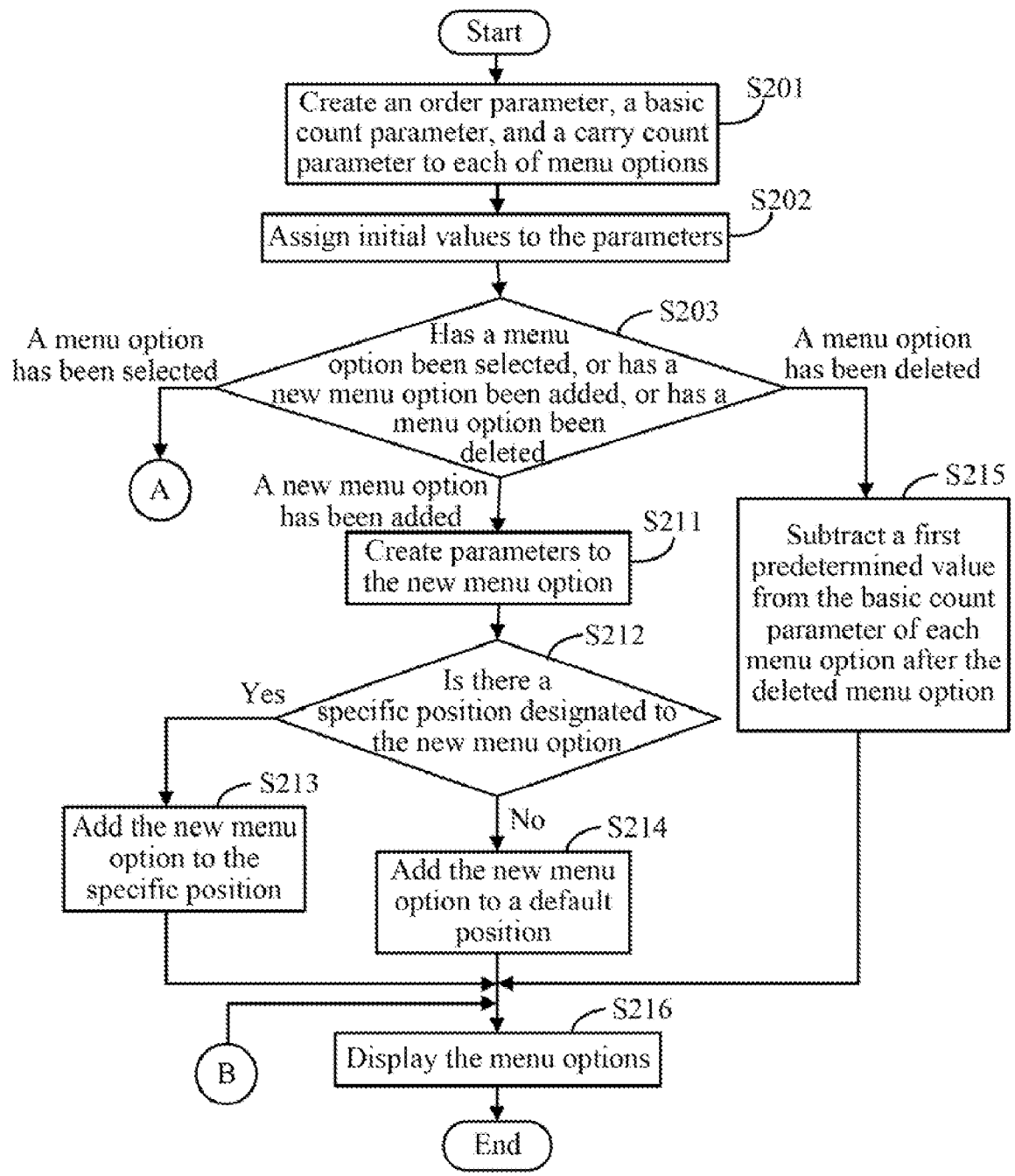
FIG. 2-a

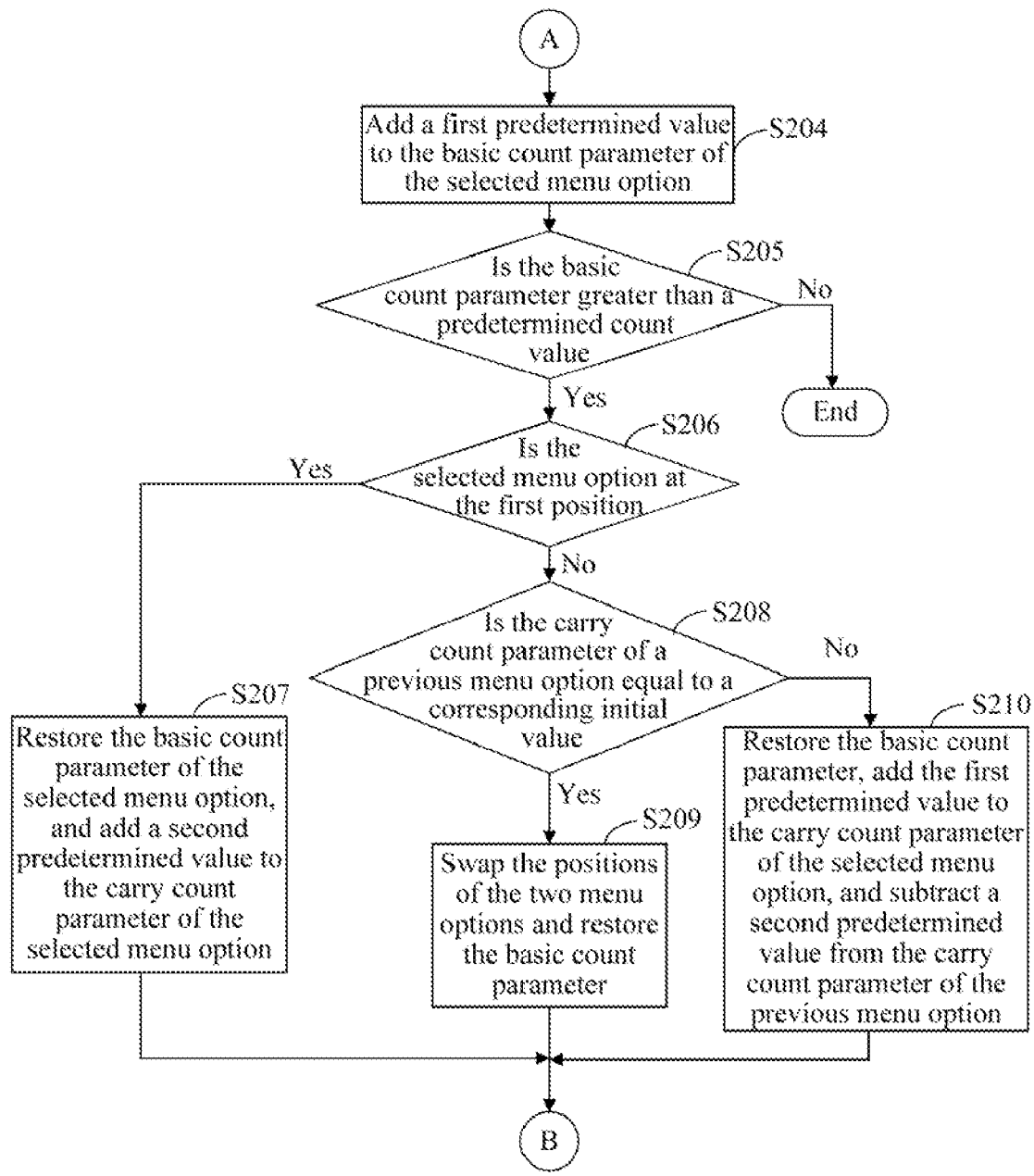
FIG. 2-b

ELECTRONIC DEVICE AND METHOD FOR SORTING MENU OPTIONS OF A PROGRAM MENU IN THE ELECTRONIC DEVICE

BACKGROUND

1. Technical Field

Embodiments of the present disclosure relate to menu management, and particularly to an electronic device and method for sorting menu options in a program menu of the electronic device.

2. Description of Related Art

Electronic devices, such as mobile phones, are increasingly equipped with more and more functions. As a result, more and more menu options are provided in the electronic devices. Display sequences of the menu options may be fixed. If a desired menu option is frequently used but is at a later position in a program menu, it is inconvenient for users to locate the menu option.

BRIEF DESCRIPTION OF THE DRAWINGS

FIG. 2 including FIG. 2-a and FIG. 2-b is a flowchart of one embodiment of a method for sorting menu options in a program menu of an electronic device.

DETAILED DESCRIPTION

All of the processes described below may be embodied in, and fully automated via, functional code modules executed by one or more general purpose processors of an electronic device. The code modules may be stored in any type of storage medium. Some or all of the methods may alternatively be embodied in specialized hardware.

Figure 1:
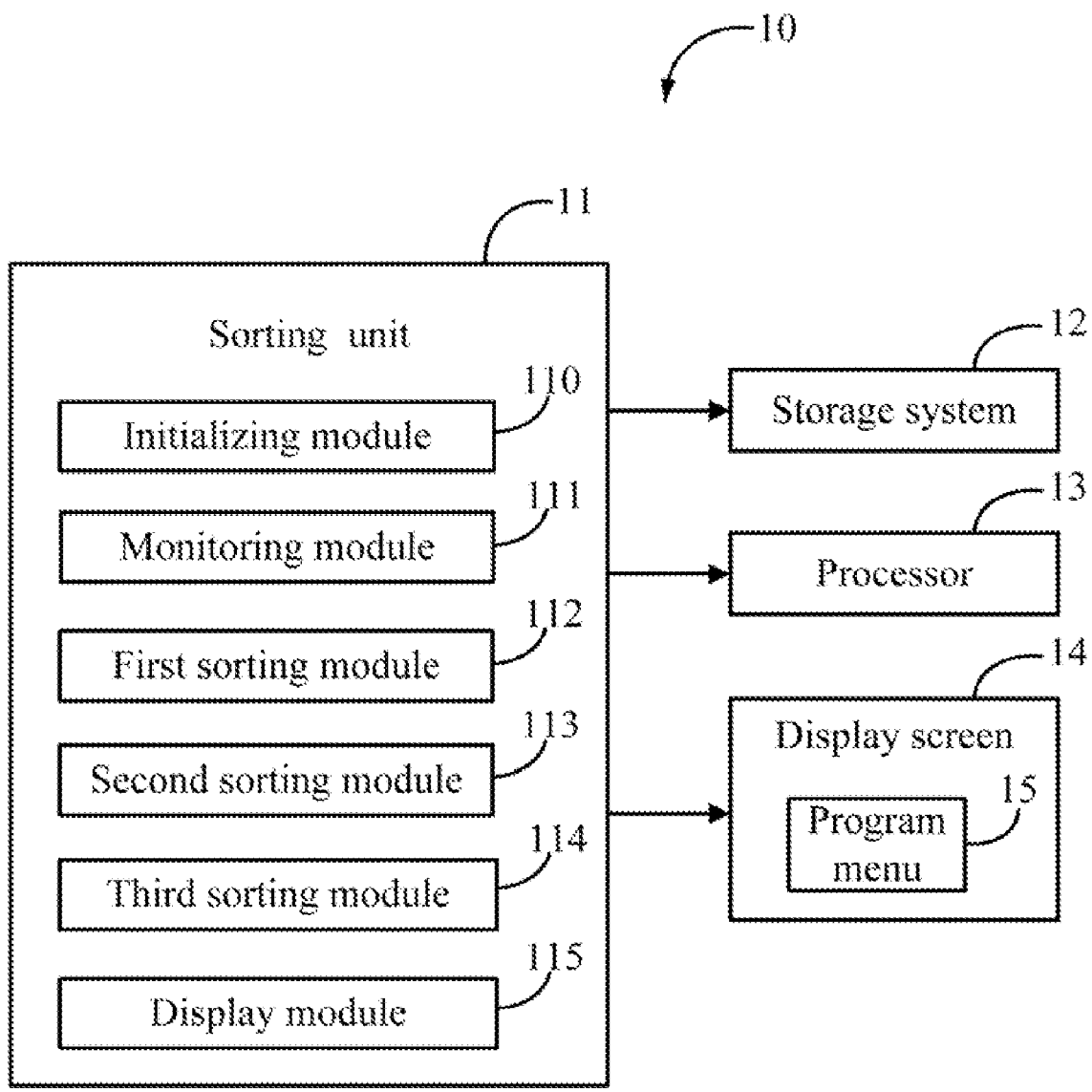
FIG. 1 is a block diagram of one embodiment of an electronic device for sorting menu options in a program menu of the electronic device.

FIG. 1 is a block diagram of one embodiment of an electronic device 10. The electronic device 10 may be used to sort menu options in a program menu 15 according to a count of a user-selected menu option. In one embodiment, the electronic device 10 may be a mobile phone or a personal digital assistant. The program menu 15 may be a shortcut menu. It may be understood that the program menu may be divided into a plurality of menu options with each menu option occupying a determined order on the program menu. The program menus may correspond to menus of a program (e.g., a word processing software, internet accessing software) displayed on a display screen 14 of the electronic device 10.

In one embodiment, the electronic device 10 includes a sorting unit 11, a storage system 12, at least one processor 13, and the display screen 14. One or more computerized codes of the sorting unit 11 are stored in the storage system 12 and executed by the processor 13. The storage system 12 may include an internal memory and an external memory. The external memory may include a smart media card (SMC), a secure digital card (SDC), a compact flash card (CFC), a multi media card (MMC), a memory system stick (MS), an extreme digital card (XDC), and a trans flash card (TFC).

The sorting unit 11 may include an initializing module 110, a monitoring module 111, a first sorting module 112, a second sorting module 113, a third sorting module 114, and a display module 115.

The initializing module 110 is operable to create an order parameter, a basic count parameter, and a carry count parameter to each of the menu options. The order parameter of a menu option indicates a display position of the menu option on the display screen 14. The menu options may be sorted and displayed according to an order parameter. The order parameter is a numerical designation of placement of the menu options. The menu options may be placed top to bottom, bottom to top, right to left, or left to right, for example. In one example, a menu option may be displayed at the first position if an order parameter of the menu option is 1. The basic count parameter and the carry count parameter may be used to record how many times a menu option has been selected. The initializing module 110 is further operable to assign an initial order value to each order parameter, assign an initial basic count value to each basic count parameter, and assign an initial carry count value to each carry count parameter. It should be understood that the display screen 14 may display a user-interface, such as a graphical user interface, on the display screen 14 corresponding to the program menus of a program.

The monitoring module 111 is operable to determine if any of the menu options of the program menu 15 have been selected, or if a new menu option has been added into the program menu 15, or if any of the menu options have been deleted from the program menu 15.

The first sorting module 112 is operable to recalculate the order parameters, the basic count parameters, and the carry count parameters of the menu options in response to a user-selected menu option in the program menu 15. The first sorting module 112 may firstly add a first predetermined value to the basic count parameter of the user-selected menu option.

The first sorting module 112 restores the basic count parameter of the user-selected menu option to the initial basic count value, and adds a second predetermined value to the carry count parameter of the user-selected menu option, if a first combination of conditions is satisfied. In the first combination of conditions, the basic count parameter of the user-selected menu option is greater than a predetermined base, and the user-selected menu option is at the first position of the program menu 15.

The first sorting module 112 swaps the order values between the user-selected menu option and the previous menu option, and restores the basic count parameter of the user-selected menu option to the initial basic count value, if a second combination of conditions is satisfied. In the second combination of conditions, the basic count parameter of the user-selected menu option is greater than the predetermined base, and the user-selected menu option is not at the first position of the program menu 15, and the carry count parameter of a menu option previous to the user-selected menu option is equal to the initial carry count value.

The first sorting module 112 restores the basic count parameter of the user-selected menu option to the initial basic count value, adds the first predetermined value to the carry count parameter of the user-selected menu option, and subtracts the second predetermined value from the carry count parameter of the previous menu option, if a third combination of conditions is satisfied. In the third combination of conditions, the basic count parameter of the user-selected menu option is greater than the predetermined base, and the user-selected menu option is not at the first position of the program menu 15, and the carry count parameter of the previous menu option is not equal to the initial carry count value.

The second sorting module 113 is operable to recalculate the order parameters, the basic count parameters, and the carry count parameters of the menu options in response to a user-added menu option into the program menu 15. The second sorting module 113 may create a new order parameter, a new basic count parameter, and a new carry count parameter to the user-added menu option. An initial value is assigned to the new order parameter according to a position of the user-added menu option in the program menu. The initial basic count value is assigned to the new basic count parameter. The initial carry count value is assigned to the new carry count parameter. The second sorting module 113 adds a third predetermined value to the order parameter of each menu option after the user-added menu option.

The third sorting module 114 is operable to recalculate the order parameters, the basic count parameters, and the carry count parameters of the menu options in response to a user-deleted menu option from the program menu 15. The third sorting module 114 may subtract the first predetermined value from the basic count parameter of each menu option after the user-deleted menu option.

The display module 115 is operable to display the menu options on the display screen 14 according to the order parameters of the menu options.

FIG. 2 is a flowchart of one embodiment of a method for sorting menu options of a program menu 15 in an electronic device 10 of FIG. 1. The method may sort the menu options according to a selection frequency of each menu option. Depending on the embodiments, additional blocks may be added, others removed, and the ordering of the blocks may be changed.

In block 201, the initializing module 110 creates an order parameter, a basic count parameter, and a carry count parameter to each of the menu options. In one example with respect to FIG. 3, the program menu 15 includes menu options "A," "B," "C," "D," and "E." A column 30 denotes order parameters of the menu options. A column 31 denotes count parameters of the menu options. A column 32 denotes carry count parameters of the menu options.

Figure 3:
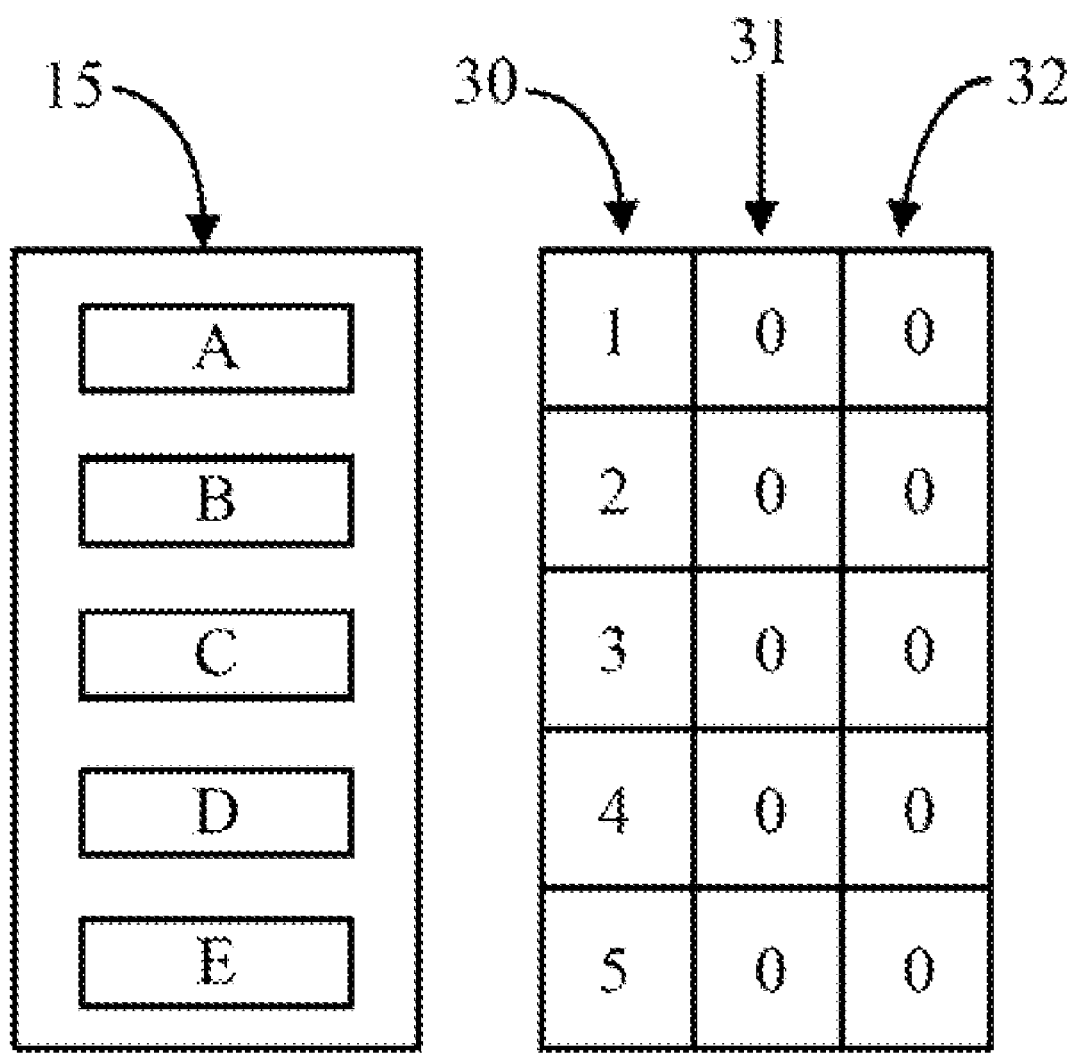
FIG. 3 illustrates one embodiment of initial values of order parameters, count parameters and carry count parameters.

In block 202, the initializing module 110 assigns an initial order value to each order parameter, assigns an initial basic count value to each count parameter, and assigns an initial carry count value to each carry count parameter. In one example as shown in FIG. 3, the initial basic count value and the initial carry count value are 0. The initial order value of one menu option corresponds to an initial position of the menu option. For example, the menu option "A" is at the first position, and the menu option "B" is at the second position. Correspondingly, the initial order value of the menu option "A" is 1, and the initial order value of the menu option "B" is 2.

In block 203, the monitoring module 111 determines if any of the menu options in the program menu 15 have been selected, or if a new menu option has been added into the program menu 15, or if any of the menu options have been deleted from the program menu 15.

If a menu options in the program menu 15 has been selected, in block 204, the first sorting module 112 adds a first predetermined value to the basic count parameter of the user-selected menu option. In one embodiment, the first predetermined value is 1.

Figure 4:
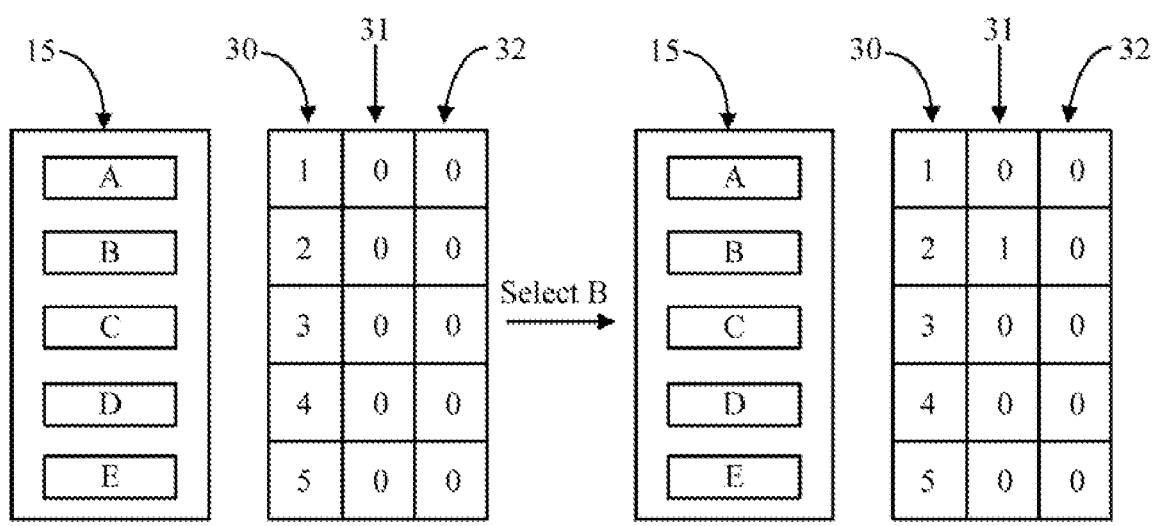
FIG. 4 illustrates one embodiment of selecting a menu option.

In block 205, the first sorting module 112 determines if the basic count parameter of the user-selected menu option is greater than a predetermined base. If the basic count parameter of the user-selected menu option is less than or equal to the predetermined base, the procedure may end. FIG. 4 illustrates one embodiment of a selection of the menu option "B." In the exemplary embodiment, the predetermined base is 4, and the basic count parameter of the user-selected menu option is less than or equal to the predetermined base. The basic count parameter of the menu option "B" is 0 before selecting the menu option "B." The basic count parameter of the menu option "B" is changed to 1 after selecting the menu option "B."

Otherwise, if the basic count parameter of the user-selected menu option is greater than the predetermined base, in block 206, the first sorting module 112 determines if the user-selected menu option is at the first position of the program menu 15.

Figure 5:
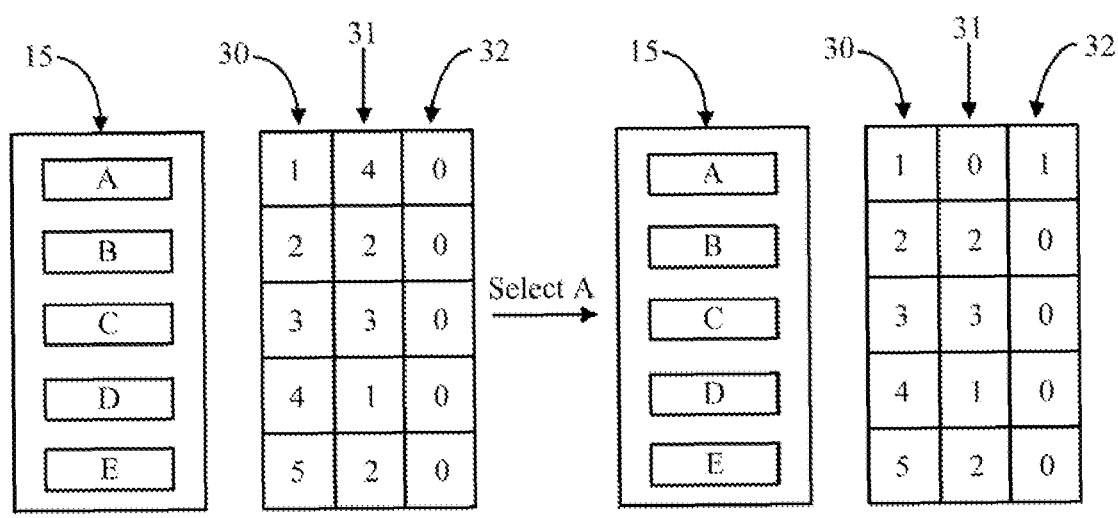
FIG. 5 illustrates another embodiment of selecting a menu option.

If the user-selected menu option is at the first position of the program menu 15, in block 207, the first sorting module 112 may restore the basic count parameter of the user-selected menu option to the initial basic count value, and add a second predetermined value to the carry count parameter of the user-selected menu option. FIG. 5 illustrates one embodiment of a selection of the menu option "A." In the exemplary embodiment, the predetermined base is 4, and the second predetermined value is 1. Before selecting the menu option "A," the basic count parameter of the menu option "A" is 4, and the carry count parameter of the menu option "A" is 0. After selecting the menu option "A," the basic count parameter of the menu option "A" is changed to 0, and the carry count parameter is changed to 1.

If the user-selected menu option is not at the first position of the program menu 15, in block 208, the first sorting module 112 determines if the carry count parameter of a menu option previous to the user-selected menu option is equal to the initial carry count value.

Figure 6:
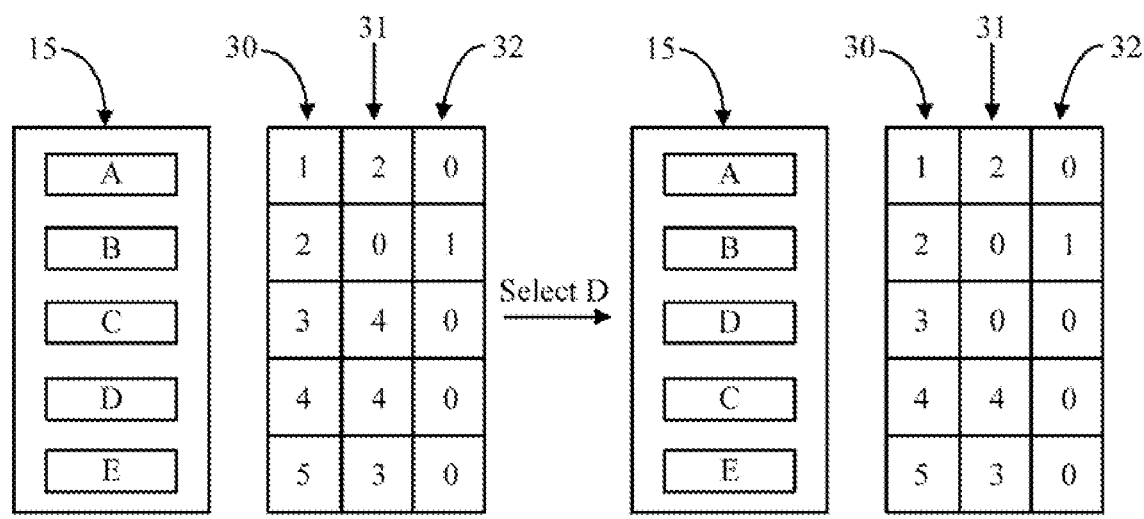
FIG. 6 illustrates further another embodiment of selecting a menu option.

If the carry count parameter of the previous menu option is equal to the initial carry count value, in block 209, the first sorting module 112 swaps the positions between the user-selected menu option and the previous menu option, and restores the basic count parameter of the user-selected menu option to the initial basic count value. FIG. 6 illustrates one embodiment of selecting the menu option "D." In the exemplary embodiment, the initial basic count value and the initial carry count value are 0. Before selecting the menu option "D," the order parameter of the menu option "D" is 4, and the basic count parameter of the menu option "D" is 4. After selecting the menu option "D," the order parameter of the menu option "D" is changed to 3, and the basic count parameter of the menu option "D" is changed to 0.

Figure 7:
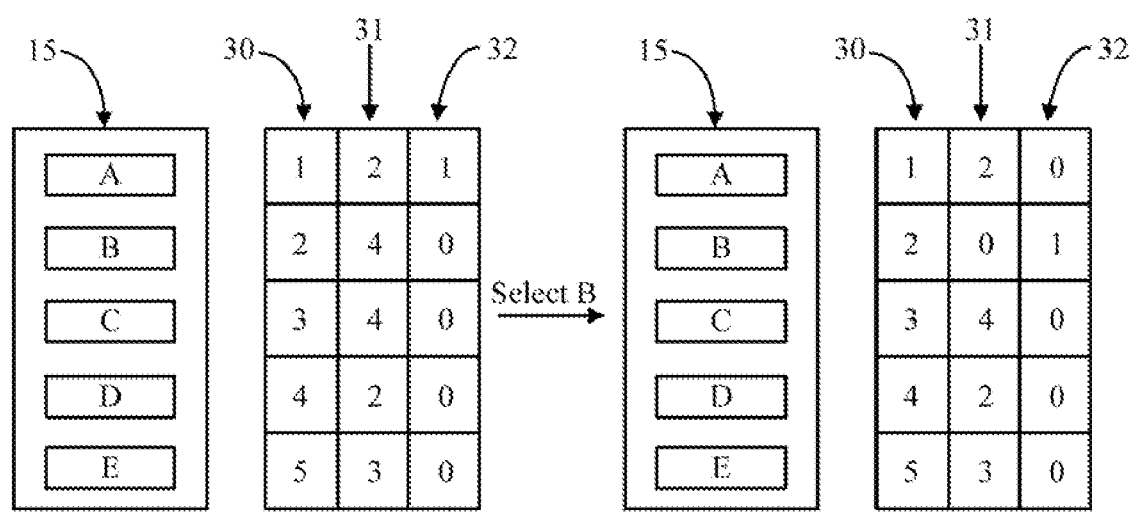
FIG. 7 illustrates further another embodiment of selecting a menu option.

Otherwise, if the carry count parameter of the previous menu option is not equal to the initial carry count value, in block 210, the first sorting module 112 restores the basic count parameter of the user-selected menu option to the initial basic count value, adds the first predetermined value to the carry count parameter of the user-selected menu option, and subtracts the second predetermined value from the carry count parameter of the previous menu option. FIG. 7 illustrates one embodiment of selecting the menu option "B." In the exemplary embodiment, the initial carry count value is 0. Before selecting the menu option "B," the basic count parameter of the menu option "B" is 4. The carry count parameter of the menu option "B" is 0. The carry count parameter of the menu option "A" is 1. After selecting the menu option "B," the basic count parameter of the menu option "B" is changed to 0. The carry count parameter of the menu option "B" is changed to 1. The carry count parameter of the menu option "A" is changed to 0.

If a new menu options has been added into the program menu 15, in block 211, the second sorting module 113 creates a new order parameter, a new basic count parameter, and a new carry count parameter to the user-added menu option.

In block 212, the second sorting module 113 determines if there is a specific position designated to the user-added menu option.

Figure 8:
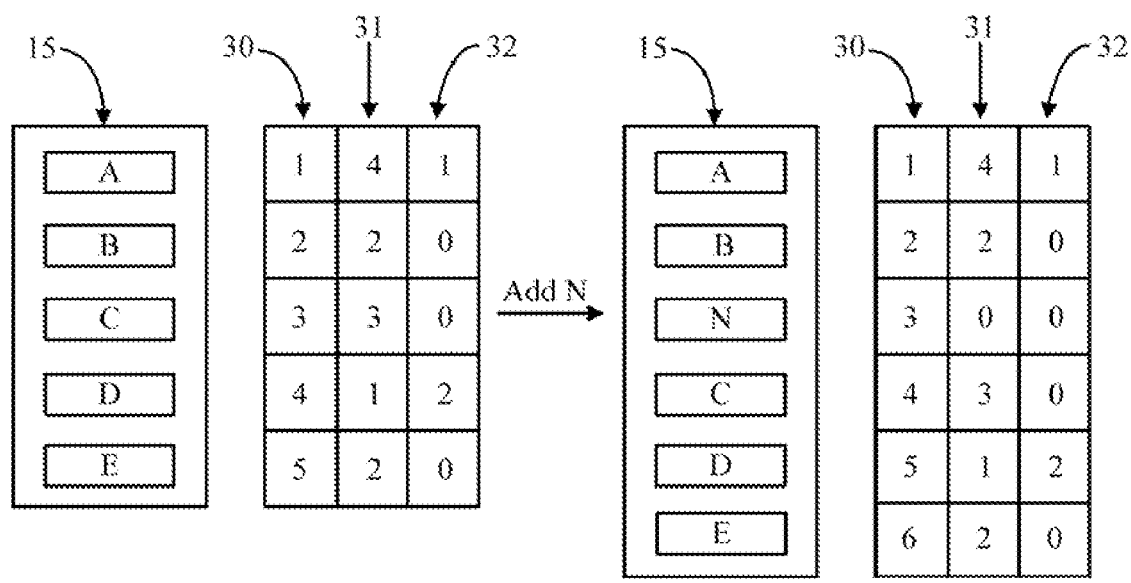
FIG. 8 illustrates one embodiment of adding a new menu option to a specific position.

If there is a specific position designated to the user-added menu option, in block 213, the second sorting module 113 assigns an initial value to the new order parameter according to the specific position, assigns the initial basic count value to the new basic count parameter, and assigns the initial carry count value to the new carry count parameter. As such, the user-added menu option has been added to the specific position. The second sorting module 113 adds a third predetermined value, such as 1, to the order parameter of each menu option after the specific position. In one example with respect to FIG. 8, a menu option "N" has been added to the third position.

Figure 9:
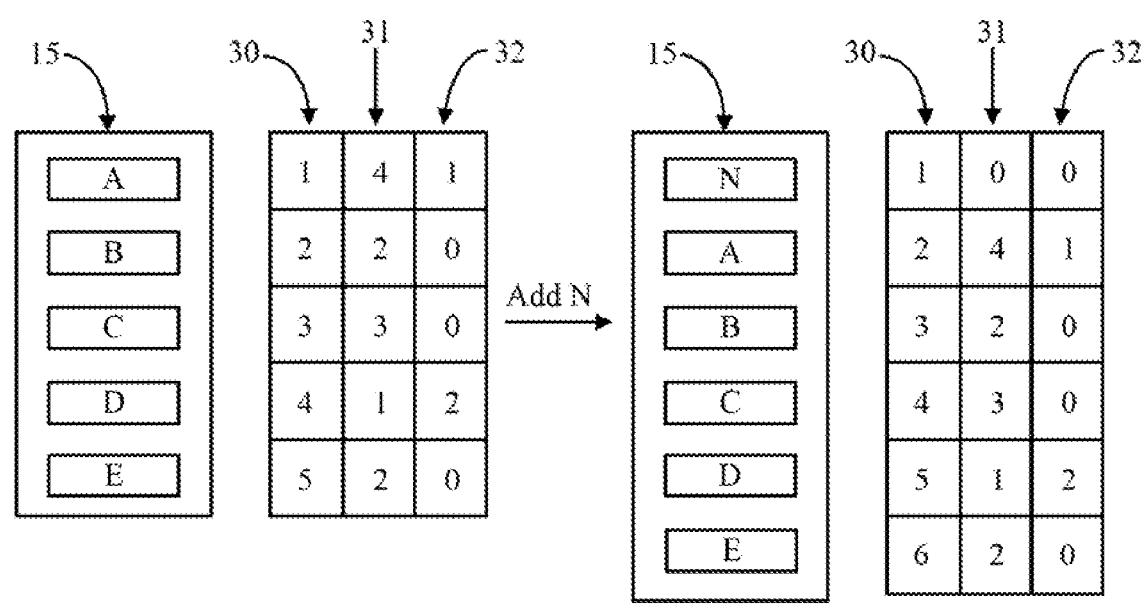
FIG. 9 illustrates one embodiment of adding a new menu option to a default position.

Otherwise, if there is not a specific position designated to the user-added menu option, in block 214, the second sorting module 113 assigns a default initial value to the new order parameter, assigns the initial basic count value to the new basic count parameter, and assigns the initial carry count value to the new carry count parameter. As such, the user-added menu option has been added to a default position. The second sorting module 113 adds the third predetermined value to the order parameter of each menu option after the default position. In one example with respect to FIG. 9, the default position is the first position.

Figure 10:
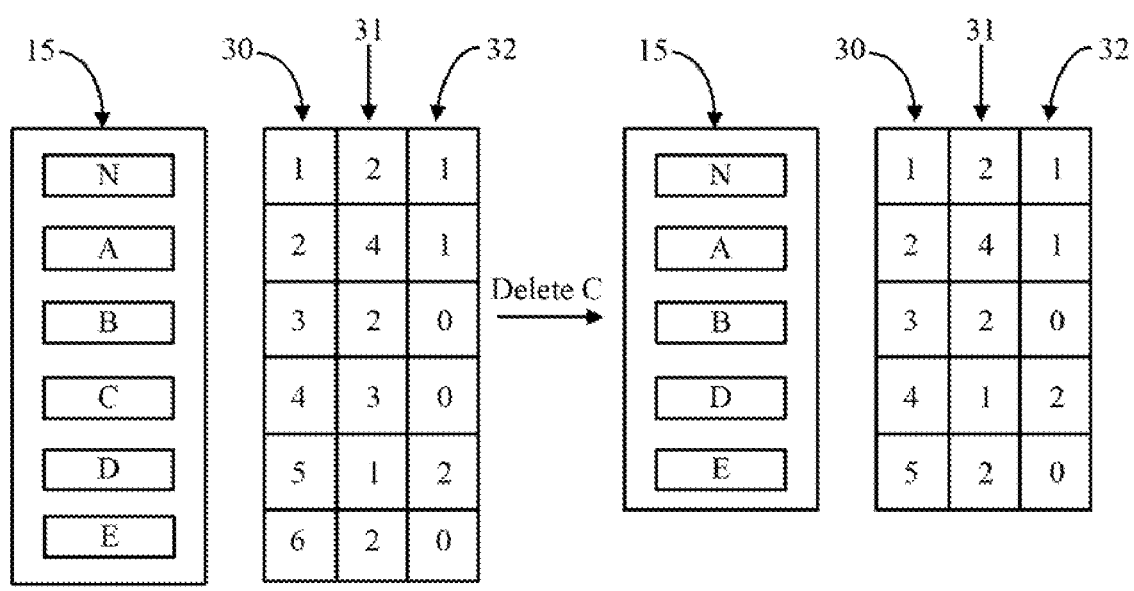
FIG. 10 illustrates one embodiment of deleting a menu option from a program menu.

If a menu options has been deleted from the program menu 15, in block 215, the third sorting module 114 subtracts the first predetermined value from the basic count parameter of each menu option after the user-deleted menu option. FIG. 10 illustrates one embodiment of deleting the menu option "C." Before deleting the menu option "C," the menu option "C" is at the fourth position, the menu option "D" is at the fifth position, and the menu option "E" is at the sixth position. After deleting the menu option "C," the menu option "D" is at the fourth position, and the menu option "E" is at the fifth position.

In block 216, the display module 114 displays the menu options on the display screen 14 according to the order parameters of the menu options.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   a storage system;
   at least one processor; and
   one or more programs stored in the storage system and being executable by the at least one processor, the one or more programs comprising:
   an initializing module to:
   create an order parameter, a basic count parameter, and a carry count parameter to menu options of a program menu of a user interface of the electronic device;
   assign an initial order value to each order parameter, and assign an initial basic count value to each count parameter; and
   assign an initial carry count value to each carry count parameter;
   a monitoring module to determine if any of the menu options in the program menu have been selected, or if a new menu option has been added to a designated position of the program menu, or if any of the menu options have been deleted from the program menu;
   a first sorting module to recalculate the order parameters, the basic count parameters, and the carry count parameters of the menu options in response to a user-selected menu option in the program menu, by means of:
   adding a first predetermined value to the basic count parameter of the user-selected menu option; and
   restoring the basic count parameter of the user-selected menu option to the initial basic count value and adding a second predetermined value to the carry count parameter of the user-selected menu option upon condition that the basic count parameter of the user-selected menu option is greater than a predetermined base and the user-selected menu option is at the first position of the program menu;
   a second sorting module to recalculate the order parameters, the basic count parameters, and the carry count parameters of the menu options in response to a user-added menu option into the program menu;
   a third sorting module to recalculate the order parameters, the basic count parameters, and the carry count parameters of the menu options in response to a user-deleted menu option from the program menu; and
   a display module to display the menu options on a display screen of the electronic device according to the order parameters of the menu options.

2. The electronic device of claim 1, wherein the first sorting module recalculates the order parameters, the basic count parameters, and the carry count parameters of the menu options in response to the user-selected menu option in the program menu, further by means of:
   swapping the positions between the user-selected menu option and a menu option previous to the user-selected menu option and restoring the basic count parameter of the user-selected menu option to the initial basic count value upon condition that the basic count parameter of the user-selected menu option is greater than the predetermined base, the user-selected menu option is not at the first position of the program menu, and the carry count parameter of the previous menu option is equal to the initial carry count value; or
   restoring the basic count parameter of the user-selected menu option to the initial basic count value, adding the first predetermined value to the carry count parameter of the user-selected menu option, and subtracting the second predetermined value from the carry count parameter of the menu option previous to the user-selected menu option upon condition that the basic count parameter of the user-selected menu option is greater than the predetermined base, the user-selected menu option is not at the first position of the program menu, and the carry count parameter of the previous menu option is not equal to the initial carry count value.

3. The electronic device of claim 2, wherein the third sorting module recalculates the order parameters, the basic count parameters, and the carry count parameters of the menu options in response to a user-deleted menu option from the program menu by means of:

subtracting the first predetermined value from the basic count parameter of each menu option after the user-deleted menu option.

4. The electronic device of claim 2, wherein each of the first predetermined value and the second predetermined value is 1.

5. The electronic device of claim 1, wherein the second sorting module recalculates the order parameters, the basic count parameters, and the carry count parameters of the menu options in response to a user-added menu option into the program menu by means of:
creating a new order parameter, a new basic count parameter, and a new carry count parameter to the user-added menu option;
assigning an initial value to the new order parameter according to a position of the menu option in the program menu, assigning the initial basic count value to the new basic count parameter, and assigning the initial carry count value to the new carry count parameter; and
adding a third predetermined value to the order parameter of each menu option after the user-added menu option.

6. The electronic device of claim 1, wherein the storage system is selected from the group consisting of a smart media card (SMC), a secure digital card (SDC), a compact flash card (CFC), a multi media card (MMC), a memory system stick (MS), an extreme digital card (XDC), and a trans flash card (TFC).

7. The electronic device of claim 1, wherein each of the initial basic count value and the initial carry count value is 0.

8. A method for sorting menu options in a program menu of an electronic device, the method comprising:
creating an order parameter, a basic count parameter, and a carry count parameter to menu options of a program menu of a user interface of the electronic device;
assigning an initial order value to each order parameter, an initial basic count value to each count parameter, and an initial carry count value to each carry count parameter;
determining if any of the menu options in the program menu have been selected, or a new menu option has been added to a designated position of the program menu, or any of the menu options have been deleted from the program menu;
recalculating the order parameters, the basic count parameters, and the carry count parameters of the menu options in response to a user-selected menu option in the program menu, comprising steps of:
adding a first predetermined value to the basic count parameter of the user-selected menu option; and
restoring the basic count parameter of the user-selected menu option to the initial basic count value, and adding a second predetermined value to the carry count parameter of the user-selected menu option upon condition that the basic count parameter of the user-selected menu option is greater than a predetermined base and the user-selected menu option is at the first position of the program menu;
recalculating the order parameters, the basic count parameters, and the carry count parameters of the menu options in response to a user-added menu option into the program menu;
recalculating the order parameters, the basic count parameters, and the carry count parameters of the menu options in response to a user-deleted menu option from the program menu; and
displaying the menu options on a display screen of the electronic device according to the order parameters of the menu options.

9. The method of claim 8, wherein the recalculating process in response to a user-selected menu option in the program menu further comprises steps of:
swapping the positions between the user-selected menu option and a menu option previous to the user-selected menu option and restoring the basic count parameter of the user-selected menu option to the initial basic count value upon condition that the basic count parameter of the user-selected menu option is greater than the predetermined base, the user-selected menu option is not at the first position of the program menu, and the carry count parameter of the previous menu option is equal to the initial carry count value; or
restoring the basic count parameter of the user-selected menu option to the initial basic count value, adding the first predetermined value to the carry count parameter of the user-selected menu option, and subtracting the second predetermined value from the carry count parameter of the menu option previous to the user-selected menu option upon condition that the basic count parameter of the user-selected menu option is greater than the predetermined base, the user-selected menu option is not at the first position of the program menu, and the carry count parameter of the previous menu option is not equal to the initial carry count value.

10. The method of claim 9, wherein the recalculating process in response to a user-deleted menu option from the program menu comprises:
subtracting the first predetermined value from the basic count parameter of each menu option after the user-deleted menu option.

11. The method of claim 9, wherein each of the first predetermined value and the second predetermined value is 1.

12. The method of claim 8, wherein the recalculating process in response to a user-added menu option into the program menu comprises:
creating a new order parameter, a new basic count parameter, and a new carry count parameter to the user-added menu option;
assigning an initial value to the new order parameter according to a position of the menu option in the program menu, assigning the initial basic count value to the new basic count parameter, and assigning the initial carry count value to the new carry count parameter; and
adding a third predetermined value to the order parameter of each menu option after the user-added menu option.

13. The method of claim 8, wherein the storage system is selected from the group consisting of a smart media card (SMC), a secure digital card (SDC), a compact flash card (CFC), a multi media card (MMC), a memory system stick (MS), an extreme digital card (XDC), and a trans flash card (TFC).

14. The method of claim 8, wherein each of the initial basic count value and the initial carry count value is 0.

15. A non-transitory computer-readable storage medium having stored thereon instructions that, when executed by an electronic device, causes the electronic device to execute a method for sorting menu options in a program menu of the electronic device, the method comprising:
creating an order parameter, a basic count parameter, and a carry count parameter to menu options of a program menu of a user interface of the electronic device;
assigning an initial order value to each order parameter, an initial basic count value to each count parameter, and an initial carry count value to each carry count parameter;
determining if any of the menu options in the program menu have been selected, or a user-added menu option has been added to a designated position of the program menu, or any of the menu options have been deleted from the program menu;

recalculating the order parameters, the basic count parameters, and the carry count parameters of the menu options in response to a user-selected menu option in the program menu, comprising steps of:

adding a first predetermined value to the basic count parameter of the user-selected menu option; and restoring the basic count parameter of the user-selected menu option to the initial basic count value, and adding a second predetermined value to the carry count parameter of the user-selected menu option upon condition that the basic count parameter of the user-selected menu option is greater than a predetermined base and the user-selected menu option is at the first position of the program menu;

recalculating the order parameters, the basic count parameters, and the carry count parameters of the menu options in response to a user-added menu option into the program menu;

recalculating the order parameters, the basic count parameters, and the carry count parameters of the menu options in response to a user-deleted menu option from the program menu; and displaying the menu options on a display screen of the electronic device according to the order parameters of the menu options.

16. The medium of claim 15, wherein the recalculating process in response to a user-selected menu option in the program menu further comprises steps of:

swapping the positions between the user-selected menu option and a menu option previous to the user-selected menu option and restoring the basic count parameter of the user-selected menu option to the initial basic count value upon condition that the basic count parameter of the user-selected menu option is greater than the predetermined base, the user-selected menu option is not at the first position of the program menu, and the carry count parameter of the previous menu option is equal to the initial carry count value; or restoring the basic count parameter of the user-selected menu option to the initial basic count value, adding the first predetermined value to the carry count parameter of the user-selected menu option, and subtracting the second predetermined value from the carry count parameter of the menu option previous to the user-selected menu option upon condition that the basic count parameter of the user-selected menu option is greater than the predetermined base, the user-selected menu option is not at the first position of the program menu, and the carry count parameter of the previous menu option is not equal to the initial carry count value.

17. The non-transitory computer-readable storage medium of claim 16, wherein the recalculating process in response to a user-deleted menu option from the program menu comprises:

subtracting the first predetermined value from the basic count parameter of each menu option after the user-deleted menu option.

18. The non-transitory computer-readable storage medium of claim 16, wherein each of the first predetermined value and the second predetermined value is 1.

19. The non-transitory computer-readable storage medium of claim 15, wherein the recalculating process in response to a user-added menu option into the program menu comprises:

creating a new order parameter, a new basic count parameter, and a new carry count parameter to the user-added menu option;

assigning an initial value to the new order parameter according to a position of the menu option in the program menu, assigning the initial basic count value to the new basic count parameter, and assigning the initial carry count value to the new carry count parameter; and adding a third predetermined value to the order parameter of each menu option after the user-added menu option.

20. The non-transitory computer-readable storage medium of claim 15, wherein each of the initial basic count value and the initial carry count value is 0.

* * * * *